US011443209B2

(12) United States Patent
Mahmud et al.

(10) Patent No.: US 11,443,209 B2
(45) Date of Patent: Sep. 13, 2022

(54) METHOD AND SYSTEM FOR UNLABELED DATA SELECTION USING FAILED CASE ANALYSIS

(71) Applicant: International Business Machines Corporation, Armonk, NY (US)

(72) Inventors: Jalal Mahmud, San Jose, CA (US); Amita Misra, San Jose, CA (US); Pritam Gundecha, San Jose, CA (US); Zhe Liu, San Jose, CA (US); Rama Kalyani T. Akkiraju, San Jose, CA (US); Xiaotong Liu, San Jose, CA (US); Anbang Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 16/850,985

(22) Filed: Apr. 16, 2020

(65) Prior Publication Data
US 2021/0326719 A1    Oct. 21, 2021

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .................................. G06N 5/04; G06N 20/00
USPC ......................................................... 706/12
See application file for complete search history.

(56) References Cited

U.S. PATENT DOCUMENTS

| 8,214,308 B2 | 7/2012 | Chu |
| 9,754,014 B2 | 9/2017 | Schmidtler et al. |
| 10,235,446 B2 | 3/2019 | Schmidtler et al. |
| 11,010,640 B1 * | 5/2021 | Daniels ............... G06V 20/593 |

(Continued)

FOREIGN PATENT DOCUMENTS

| GB | 2584727 A | * 12/2020 | ............. G06N 20/00 |
| JP | 2019536168 A | * 12/2019 | ............. G06N 00/00 |
| JP | 2021082319 A | * 5/2021 | ........... G06K 9/6256 |

OTHER PUBLICATIONS

Weng, "Machine Learning for Clinical Predictive Analysis," arXiv. 1909.09246, 2019, pp. 1-11. (Year: 2019).*

(Continued)

*Primary Examiner* — Peter C Shaw
(74) *Attorney, Agent, or Firm* — Terrile, Cannatti & Chambers, LLP; Michael Rocco Cannatti (57) ABSTRACT

A method, system, and a computer program product automatically select training data for updating a model by applying human-annotated training data to a model to generate results that are evaluated to identify correct case results and false case results that are categorized into error type categories for use in building error models corresponding to the error type categories, where each error model is built from at least failed case results belonging to a corresponding error type, and where unlabeled data samples are applied to each error model to compute an error likelihood for each unlabeled data sample with respect to each error type category, thereby enabling the selection and display of unlabeled data samples for annotation by a subject matter expert based on a computed error likelihood for the one or more unlabeled data samples in a specified error type category meeting or exceeding an error threshold requirement.

19 Claims, 3 Drawing Sheets

(56) References Cited

U.S. PATENT DOCUMENTS

| | | | |
|---|---|---|---|
| 2019/0325259 A1* | 10/2019 | Murphy | G06N 20/00 |
| 2019/0392351 A1* | 12/2019 | Zuluaga | G06N 20/20 |
| 2020/0097389 A1* | 3/2020 | Smith | G06F 11/3612 |
| 2021/0133462 A1* | 5/2021 | Roberts | G06K 9/6256 |
| 2021/0233512 A1* | 7/2021 | Peyser | G06N 3/0445 |

OTHER PUBLICATIONS

Georgoulopoulos et al., "A Survey on Hardware Failure Prediction of Servers Using Machine Learning and Deep Learning," IEEE, 2021, pp. 1-5, doi: 10.1109/MOCAST52088.2021.9493360. (Year: 2021).*

Zhao et al., "Prediction of Electrical and Physical Failure Analysis Success Using Artificial Neural Networks," IEEE, 2018, pp. 1-5, doi: 10.1109/IPFA.2018.8452176. (Year: 2018).*

Losing et al., "Personalized Online Learning with Pseudo-Ground Truth," IEEE, 2020, pp. 8963-8969, doi: 10.1109/IROS45743.2020. 9341632. (Year: 2020).*

Eric Breck et al., Data Validation for Machine Learning, Proceedings of the 2nd SysML Conference, Palo Alto, CA, 2019.

Anonymous, ip.com, IPCOM000252096D; Determining Validity Of A Point Of Interest Based On Existing Data, Dec. 15, 2017.

Anonymous, ip.com, IPCOM000252359D; Identifying And Determining Trustworthiness Of A Machine-Learned Model, Jan. 5, 2018.

Anonymous, ip.com, IPCOM000252365D; Retrospective User Input Inference and Correction, Jan. 5, 2018.

McKinsey Global Institute, McKinsey & Company; The Age Of Analytics: Competing In A Data-Driven World, Dec. 2016.

Katerina Veselovska et al., Why Words Alone Are Not Enough: Error Analysis of Lexicon-Based Polarity Classifier for Czech, Proceedings of the 3rd Workshop on Sentiment Analysis where AI meets Psychology (SAAIP 2013), IJCNLP 2013, pp. 105, Nagoya, Japan, Oct. 14, 2013.

Wikipedia, Stratified Sampling, edited Dec. 14, 2019, https://en.wikipedia.org/w/index.php?title=Stratified_sampling&oldid=930714746.

Zheng Jiang et al., Training Sample Selection for Deep Learning of Distributed Data, IEEE ICIP 2017.

Ahmed Abbasi et al., Benchmarking Twitter Sentiment Analysis Tools, 9th Language Resources and Evaluation Conference, May 2014.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

\* cited by examiner

METHOD AND SYSTEM FOR UNLABELED DATA SELECTION USING FAILED CASE ANALYSIS

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. To train such QA systems, a subject matter expert (SME) presents ground truth or training data in the form of question-answer-passage (QAP) triplets or answer keys to a machine learning algorithm. Typically derived from fact statements submissions to the QA system, such ground truth data is expensive and difficult to collect. Conventional approaches for developing ground truth (GT) will use an annotator component to identify entities and entity relationships according to a statistical model that is based on ground truth. Such annotator components are created by training a machine-learning annotator with training data and then validating the annotator by evaluating training data with test data and blind data, but the selection and generation of training data is important to achieve good accuracy for such machine learning systems. There are existing data sampling approaches for alleviating the burden of obtaining hand-labeled data sets, such as weak supervision, where noisy, limited, or imprecise sources are used to provide supervision signal for labeling large amounts of training data in a supervised learning setting, but the use of inexpensive weak labels comes with the tradeoff that the resulting data sets are imperfect and often error-prone. Even when the process of obtaining training data is expedited by using dictionary and rule-based annotators to pre-annotate the ground truth, SMEs must still review and correct the training data labels in the machine-annotated ground truth. With hundreds or thousands of training data instances to review, the accuracy of the SME's validation work can be impaired due to fatigue or sloppiness as the SME skims through too quickly to accurately complete the task. As a result, the existing solutions for efficiently generating and validating ground truth data are extremely difficult at a practical level.

SUMMARY

Broadly speaking, selected embodiments of the present disclosure provide an automated training data selection system, method, and apparatus for generating ground truth for a machine-learning model by selecting unlabeled training data for updating a machine learning model which reduces a predetermined type of error as identified by subject matter or domain expert. In selected embodiments, the training data selection system is operative to select training data for the machine-learning model by using error classifications of failed cases from the machine-learning model to generate error classification models that are applied to unlabeled training data to select unlabeled data for subject matter expert annotation which reduces a predetermined type of error as identified by the subject matter expert. In operation, the training data selection system is operative to apply a first set of training data ($D_i$) to an initial machine learning model and to generate therefrom a plurality of results ($R_i$) which are used to identify correct cases ($C_j$) and failed cases ($F_k$) from the first set of training data. Using an error taxonomy or classifier which may be automatically or manually generated, the training data selection system categorizes or classifies the failed cases from the initial machine learning model into one or more predetermined error type categories ($E_m$), such as classifier misprediction, negation error, and incorrectly labeled ground truth. In selected embodiments, the classification of failed cases into the predetermined error type categories ($E_m$) may be performed manually by the subject matter expert, or may be performed using vector processing computations to detect a similarity between vector representations of failed cases and vector representations of the predetermined error type categories ($E_m$). Using features extracted from the correct cases ($C_j$), failed cases ($F_k$), and/or predetermined error type categories ($E_m$) as training data, the training data selection system builds one or more error type models ($EM_n$) or error rules which can predict the likelihood of an input (unlabeled) data sample being correctly classified. Once the error type models or rules ($EM_n$) are constructed, the training data selection system applies unlabeled training data to the models/rules ($EM_n$) to compute a likelihood that the unlabeled data will be incorrectly classified or labeled. For each specified error type, the training data selection system applies an error threshold requirement to determine which unlabeled data exceeds the error threshold, thereby selecting unlabeled training data that should be annotated or labeled by the SME or human annotator to generate new training data that is applied to retrain the machine-learning model. By selecting unlabeled data on the basis of reducing predetermined types of errors, the subject matter expert can quickly and efficiently focus annotation efforts on annotating unlabeled data which are more likely to result in specific error type.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing ground truth data for improved training and evaluation of cognitive QA systems.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments described herein may enable more efficient and accurate generation of training data for machine-learning models by using error models to identify unlabeled training data for annotation by the human subject matter expert. The training data selection methodology may involve individual steps that can be performed by a subject matter expert, but it will be appreciated that an information handling system or other computing device may be used that is specifically configured to implement one or more parts of the training data selection system or methodology. The configuring of the computing device may comprise the providing of application specific hardware, firmware, or the like to facilitate the performance of the operations and generation of the outputs described herein with regard to the illustrative embodiments. In addition or in the alternative, the configuring of the computing device may include storing software applications in one or more storage devices and loaded into memory of a computing device, such as the information handling system, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

Figure 1:
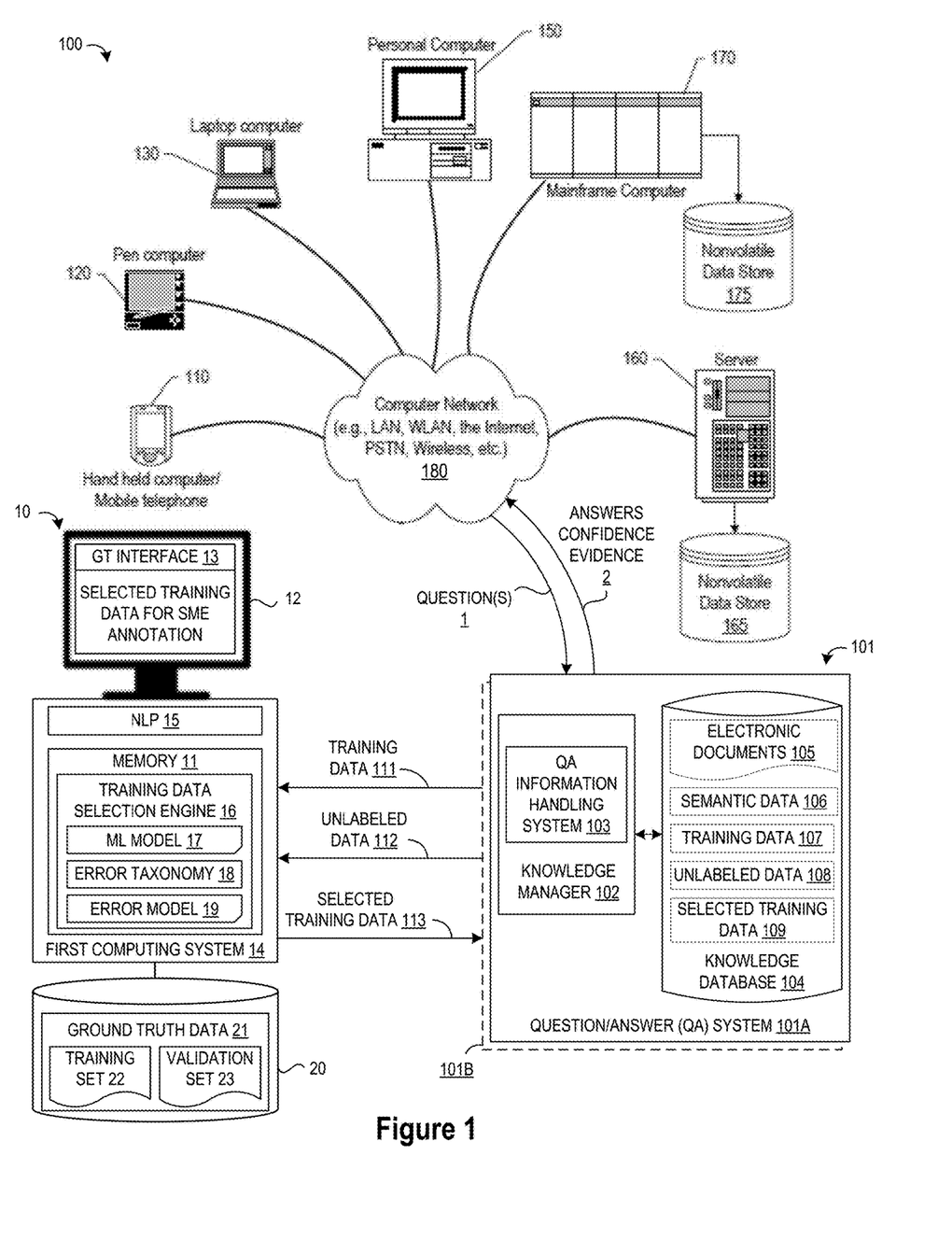
FIG. 1 depicts a system diagram that includes a QA system connected in a network environment to a computing system that uses a training data selection engine to select unlabeled data for annotation by a subject matter expert to use as ground truth data for a machine learning model.

To provide additional details for an improved understanding of selected embodiments of the present disclosure, reference is now made to FIG. 1 which depicts a network environment 100 in which an information handling system and/or computing system is capable of performing the computing operations described herein. In the network environment, a question/answer (QA) system 101 is directly or indirectly connected to a first computing system 14 that uses the training data selection engine 16 to select unlabeled data for annotation by a subject matter expert to use as ground truth data for a machine-learning model 17. The QA system 101 may include one or more QA system pipelines 101A, 101B, each of which includes a knowledge manager computing device 102 (comprising one or more processors and one or more memories, and potentially any other computing device elements generally known in the art including buses, storage devices, communication interfaces, and the like) which implements an information handling system 103 for processing questions 1 received over the network 180 from one or more users at computing devices (e.g., 110, 120, 130) in order to generate answers 2. Over the network 180, the computing devices communicate with each other and with other devices or components via one or more wired and/or wireless data communication links, where each communication link may comprise one or more of wires, routers, switches, transmitters, receivers, or the like. In this networked arrangement, the QA system 101 and network 180 may enable question/answer (QA) generation functionality for one or more content users. Other embodiments of QA system 101 may be used with components, systems, subsystems, and/or devices other than those that are depicted herein.

Types of information handling systems that can utilize QA system 101 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, server 160, and mainframe computer 170. As shown, the various information handling systems can be networked together using computer network 180. Types of computer network 180 that can be used to interconnect the various information handling systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores. For example, server 160 utilizes nonvolatile data store 165, and mainframe computer 170 utilizes nonvolatile data store 175. The nonvolatile data store can be a component that is external to the various information handling systems or can be internal to one of the information handling systems.

In the QA system 101, the knowledge manager 102 may be configured to receive inputs from various sources. For example, knowledge manager 102 may receive input from the network 180, one or more knowledge bases or corpora 104 of electronic documents 105, semantic data 106, or other data, content users, and other possible sources of input. In selected embodiments, the knowledge base 104 may include structured, semi-structured, and/or unstructured content in a plurality of documents that are contained in one or more large knowledge databases or corpora. The various computing devices (e.g., 110, 120, 130) on the network 180 may include access points for content creators and content users. Some of the computing devices may include devices for a database storing the corpus of data as the body of information used by the knowledge manager 102 to generate answers to cases. The network 180 may include local network connections and remote connections in various embodiments, such that knowledge manager 102 may operate in environments of any size, including local networks (e.g., LAN) and global networks (e.g., the Internet). Additionally, knowledge manager 102 serves as a front-end system that can make available a variety of knowledge extracted from or represented in documents, network-accessible sources and/or structured data sources. In this manner, some processes populate the knowledge manager which may include input interfaces to receive knowledge requests and respond accordingly.

As further described below, when a process evaluates a given section of a document for semantic content, the process can use a variety of conventions to query it from the knowledge manager. One convention is to send a well-formed question 1. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 1 (e.g., natural language questions, etc.) to the knowledge manager 102. Knowledge manager 102 may interpret the question and provide a response to the content user containing one or more answers 2 to the question 1. In some embodiments, the knowledge manager 102 may provide a response to users in a ranked list of answers 2.

In some illustrative embodiments, knowledge manager 102 may be embodied as part of the IBM Watson™ QA system 101 available from International Business Machines Corporation of Armonk, N.Y., which is augmented with the mechanisms of the illustrative embodiments described hereafter. The IBM Watson™ knowledge manager/QA system may receive an input question 1 which it then parses to extract the major features of the question, that in turn are then used to formulate queries that are applied to the corpus of data stored in the knowledge base 104. Based on the application of the queries to the corpus of data, a set of hypotheses, or candidate answers to the input question, are generated by looking across the corpus of data for portions of the corpus of data that have some potential for containing a valuable response to the input question.

In particular, a received question 1 may be processed by the IBM Watson™ knowledge manager/QA system 101 which performs deep analysis on the language of the input question 1 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ knowledge manager/QA system. The statistical model may then be used to summarize a level of confidence that the IBM Watson™ knowledge manager/QA system has regarding the evidence that the potential response, i.e., candidate answer, is inferred by the question. This process may be repeated for each of the candidate answers until the IBM Watson™ knowledge manager/QA system identifies candidate answers that surface as being significantly stronger than others and thus, generates a final answer, or ranked set of answers, for the input question. The knowledge manager/QA system then generates an output response or answer 2 with the final answer and associated confidence and supporting evidence. More information about the IBM Watson™ knowledge manager/QA system may be obtained, for example, from the IBM Corporation website, IBM Redbooks, and the like. For example, information about the IBM Watson™ knowledge manager/QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In selected embodiments, the information handling system 101 may be implemented with a first computing device 10 that includes a display 11, one or more processing devices 12, and a memory or database storage 13. In the first computing system 10, a processing device 12, such as a natural language processor (NLP), executes program code instructions 14 and data 15 stored in memory 13 for implementing a multipath video action classifier engine 16.

In addition to providing answers to questions, QA system 101 is connected to at least a first computing system 14 having a connected display 12, one or more processing devices 15, memory 11, and database storage 20. In the first computing system 14, a processing device 15, such as a natural language processor (NLP), executes program code instructions and data stored in memory 11 or storage 20 for implementing a training data selection engine 16 to generate new ground truth for training a machine-learning model 17 by processing unlabeled training data 108 for annotation or labeling by the subject matter or domain expert on the basis of reducing a predetermined type of error. Though shown as being directly connected to the QA system 101, the first computing system 14 may be indirectly connected to the QA system 101 via the computer network 180. Alternatively, the functionality described herein with reference to the first computing system 14 may be embodied in or integrated with the QA system 101.

Whether embodied in the first computing system 14 or QA system 101, the training data selection engine 16 is operatively executed with the processing device(s) 15 and memory 11 to retrieve a first training test dataset $(D_i)$ 111 that may be stored as training data 107 in the knowledge database 104 (or alternatively stored as a training dataset 22 in database storage 20). The training data selection engine 16 then applies the first training test dataset $(D_i)$ to an initial machine learning model 17 to generate a plurality of results (10 which are used to identify correct cases $(C_j)$ and failed cases $(F_k)$ from the first training test dataset $(D_i)$, where j+k=i. Using the training data selection engine 16 and/or manual analysis by a domain expert, the failed cases $(F_k)$ are categorized or classified into m error type categories $(E_m)$ specified in an error taxonomy 18. Using features extracted from the correct cases $(C_j)$, failed cases $(F_k)$, and/or predetermined error type categories $(E_m)$ as training data, the training data selection engine 16 and/or domain expert builds or generates one or more error rules or error type models $(EM_mn)$ 19 which can predict the likelihood of an input (unlabeled) data sample being correctly (or incorrectly) classified. Once the error type models 19 are built, the training data selection engine 16 then retrieves unlabeled training data 112 (e.g., from the database storage 108) and applies the unlabeled data to the error model 19 to compute a likelihood that the unlabeled data will be incorrectly classified or labeled. For each specified error type, the training data selection engine 16 applies an error threshold requirement to determine which unlabeled data exceeds the error threshold, thereby selecting unlabeled training data that should be annotated or labeled by the SME or human annotator to generate new training data that is applied to retrain the machine-learning model 17.

As disclosed, the selected unlabeled training data 113 may be transferred to the knowledge database 104 for storage as selected training data 109. In addition or in the alternative, the selected unlabeled training data 113 may be displayed with the ground truth interface 13 on the display 12. To visually present the selected unlabeled training data for SME review and labeling, the training data selection engine 16 is configured to display a ground truth (GT) interface 13 on the connected display 12. At the GT interface 13, the user at the first computing system 14 can manipulate a cursor or otherwise interact with a displayed listing of selected unlabeled training data sets that are flagged for SME annotation on the basis of reducing one or more specified error types.

Verification or correction information assembled in the ground truth interface window 13 based on input from the domain expert or system knowledge expert may be used to store and/or send updates to the training set 22 for use in re-training the machine-learning model 17.

Figure 2:
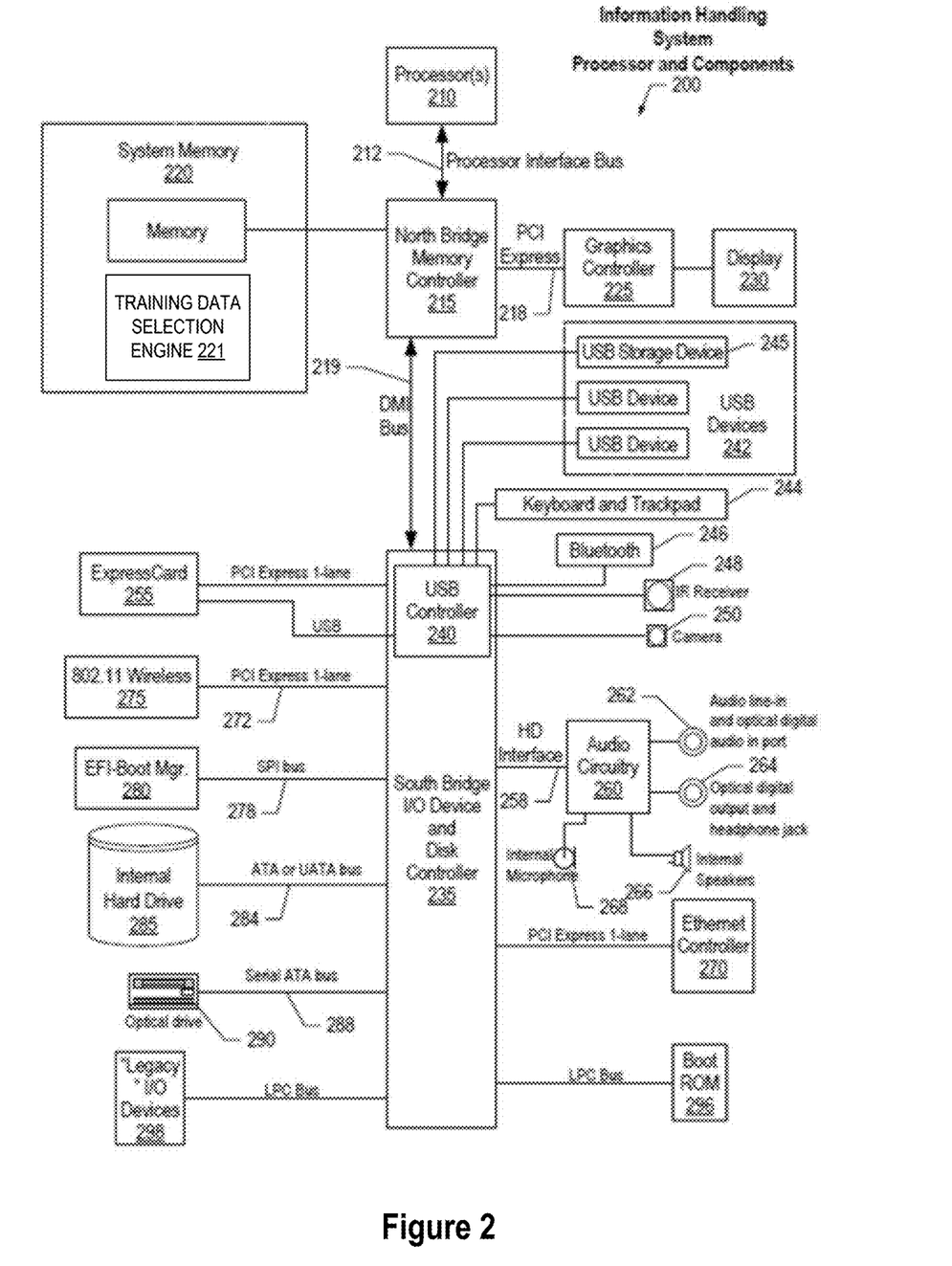
FIG. 2 is a block diagram of a processor and components of an information handling system such as those shown in FIG. 1.

To provide additional details for an improved understanding of selected embodiments of the present disclosure, reference is now made to FIG. 2 which illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a training data selection engine module 221 which may be invoked to process ground truth training data at a machine-learning model to identify failed cases which are used to build error classification models that are applied to unlabeled training data to select unlabeled data for subject matter expert annotation which reduces a predetermined type of error as identified by the subject matter expert, thereby generating verified ground truth for use in retraining and evaluating the machine-learning model. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various buses used to connect various components. These buses include, for example, PCI and PCI Express buses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
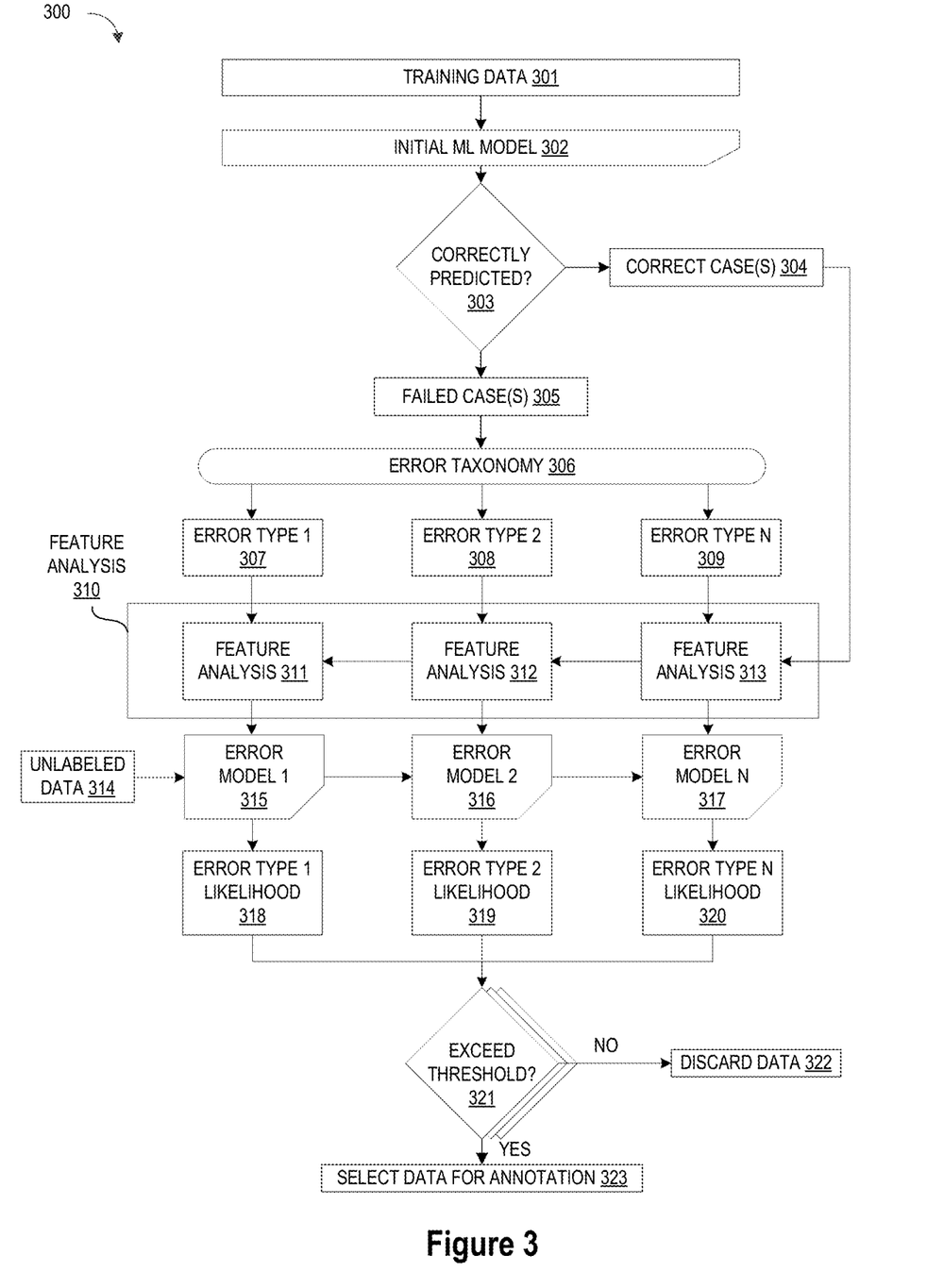
FIG. 3 illustrates a simplified flow chart showing the logic for selecting unlabeled data for annotation by a subject matter expert to use as ground truth data for training a machine learning model.

To provide additional details for an improved understanding of selected embodiments of the present disclosure, reference is now made to FIG. 3 which depicts a simplified flow chart 300 showing the logic for selecting unlabeled data for annotation by a subject matter expert to use as ground truth data for training a machine learning model. The processing shown in FIG. 3 may be performed in whole or in part by a cognitive computing system, such as the QA system 101, the information handing system 103, computing system 14, or other computational processing system which uses natural language processing services, classifier services, and related analytics analysis to construct and execute a machine-learning model, to classify failed cases into specified error types based on an error taxonomy, and to construct and execute one or more error type models which are used to identify unlabeled training data to be for SME annotation to generate training data for a machine learning model.

FIG. 3 processing commences at 301 when a first set of training data (a) is retrieved or assembled. In selected embodiments, the training data is test data that has been labeled or annotated by a human subject matter expert. In addition or in the alternative, the training data may be retrieved from storage in memory, such as the training data 107 or training dataset 22.

At step 302, an initial machine learning model is built or retrieved from memory. In selected embodiments, the processing at step 302 is performed by the training data selection engine 16 and/or domain expert using any suitable model analytic and construction tools to build the initial machine learning model 17 from a set of available training data 107. For example, a domain expert may initially build the initial machine learning model 17 from a set of available training data 107. In addition or in the alternative, the initial machine learning model 17 may be retrieved from storage in memory, such as the memory 11 or knowledge database 104.

At step 303, a first set of training or test data ($D_i$) is applied to the initial machine learning model to determine if the ML model makes correct predictions from the test data, thereby identifying one or more correct cases 304 and failed cases 305. In selected embodiments, the processing at step 303 is performed by the training data selection engine 16 and/or domain expert which applies test data 107 to the machine learning model 17 to generate a plurality of results ($R_i$) which are used to identify correct cases ($C_j$) and failed cases ($F_k$). For example, a domain expert may run tests on the initial machine learning model 17 using training data 107, and then identify failed cases ($F_k$) from the test data where the prediction of the ML model 17 does not match the ground truth annotation on test set.

At step 306, an error taxonomy or classifier is developed or obtained. In selected embodiments, the error taxonomy 18 is built by a domain expert, alone or in combination with the training data selection engine 16, by analyzing the failed cases $F_k$ 305 based on the expert's domain knowledge of the machine learning problem. As will be appreciated, there are a variety of suitable techniques for constructing an error taxonomy using any suitable analytic and NLP tools to construct an error category classifier. In addition or in the alternative, the error taxonomy 18 may be retrieved from storage in memory, such as the memory 11 or knowledge database 104.

Upon applying the failed cases 305 to the error taxonomy 306, the existing failed cases 305 are categorized into corresponding error categories or types 307-309 (e.g., Error Type 1, Error Type 2, . . . Error Type N). In selected embodiments, the domain expert, alone or in combination with the training data selection engine 16, categorizes existing failed cases ($F_k$) to each error category (e.g., Error Type 1 307). Alternatively, the identified failed cases ($F_k$) may be sent through an error taxonomy classifier or annotator (at step 306) which assigns each failed case ($F_k$) to a corresponding error category 307-309 (e.g., Error Type 1, Error Type 2, . . . Error Type N). To provide an illustrative, non-limiting example, with sentiment prediction machine learning applications, a "negation error" is an example error category where the sentiment is difficult to predict, "mislabeled sample" is another example error category where ground truth is incorrectly labeled, and so on. In selected embodiments, the classification of failed cases into the predetermined error type categories ($E_m$) may be performed manually by the subject matter expert, or may be performed using vector processing computations to detect a similarity between vector representations of failed cases and vector representations of the predetermined error type categories ($E_m$).

At step 310, feature analysis processing is applied to extract predetermined features from the input error categories or types 307-309, correct cases ($C_j$) 304, and/or failed cases ($F_k$) 305 in order to develop one or more error models 315-317. In selected embodiments, the feature analysis processing at step 310 is performed at the training data selection engine 16 which uses one or more feature analysis parsing tools 311-313 which apply NLP processing to extract error modeling features, such as n-grams, topics, POS based features, syntactic and syntax features, etc. As described herein, a Natural Language Processing (NLP) routine may be used to parse the input sentence and/or identify predetermined features, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. By way of example and not limitation, the feature analysis processing 310-313 may be configured to extract any suitable error modeling features, such as First Verb, Last verb, conditional consequent, conditional antecedent, Adjective; average word embedding for the entire document (50 dimension); modal classes; aspect; tense; voice; interrogative; sentence types; context features; dictionary-based features; features using Syntax trees/dependency trees; and the like. As disclosed here, the extracted set of features from the feature analysis processing 310 may (or may not) be the same features used to build initial machine learning prediction model 302 (e.g., sentiment model which is applied to the test data). As a result, the domain expert may, in selected embodiments of the present disclosure, specify an explainable set of features that can explain that their intended use with the model(s) error, though this is not a requirement for the initial ML model since that can be trained as a black box from large amount of training data.

At steps 315-317, one more machine learning error models (e.g., Error Model 1, Error Model 2, . . . Error Model N) are built or retrieved from memory. In selected embodiments, the processing at steps 315-317 is performed by the training data selection engine 16 and/or domain expert using any suitable model analytic and construction tools to build one or more machine learning rules or models for errors ($EM_n$) 19 from the error training data features extracted from the correct cases ($C_j$), failed cases ($F_k$), and/or predetermined error type categories ($E_m$). In addition or in the alternative, the error machine learning models ($EM_n$) 19 may be retrieved from storage in memory, such as the memory 11 or knowledge database 104.

In selected embodiments, one or more of the error models 315-317 may be machine learning models that are built from failed cases ($F_k$) (i.e., error cases) and correctly identified cases ($C_j$) as training data. As noted above, the correct cases 304 and failed cases 305 are identified by applying test data 301 to the initial machine learning model 302, so error type prediction from original model 302 is used in this way. Once trained, the machine learning error models ($EM_n$) 19 can predict likelihood of an input data sample being classified correctly. In other embodiments, one or more of the error models 315-317 may be built for each specific type of error (e.g., Error Model 1). For example, a "negation error" is a well-known error for predicting sentiment. In this example, positive examples of such an error model can be samples which are identified for negation error, and negative examples can be all correctly classified instances, or correctly classified instances and examples of other error types. In another embodiments, one or more of the error models 315-317 may be built as a classifier which uses a multi-class setting where each error type can be class, and there is another class for correct predictions (i.e., "no-error").

At step 314, unlabeled training or sample data is applied to the one or more error models 315-317 to compute error likelihoods 318-320 that the unlabeled data 314 will be incorrectly classified or labeled. In selected embodiments, the processing of the unlabeled data 314 by the error models 315-317 is performed by the training data selection engine 16 and/or domain expert to compute the likelihood of different errors on such data 314. For example, given an unlabeled data sample 314 for sentiment model, the error model 19 may compute the likelihood of "mislabel" error type is 0.8, or may compute the likelihood of "negation error" error type is 0.5. Such error likelihoods 318-320 may be used for selecting the unlabeled data for annotation.

At step 321, each computed error type likelihood 318-320 may be evaluated against one or more error threshold values to determine which unlabeled data exceeds the error threshold. In selected embodiments, the error threshold evaluation at step 321 is performed separately for each error type by the training data selection engine 16 and/or domain expert to determine if the computed error likelihood of different errors exceeds an error threshold. If threshold detection step 321 determines that the computed error likelihood for an unlabeled data sample does not exceed the error threshold value for a specific error type (negative outcome to decision step 321), then the unlabeled data sample is discarded (step 322). However, if threshold detection step 321 determines that the computed error likelihood for an unlabeled data sample does meet or exceed the error threshold value for a specific error type (affirmative outcome to decision step 321), then the unlabeled data sample is selected for annotation or labeling by the SME or human annotator (step 322), thereby generating new training data that is applied to retrain the machine-learning model.

As a result of the processing steps 301-323, the training data selection process enables the SME to focus their annotation efforts on annotating unlabeled data which is more likely to result in specific error type. In addition, the ability to automate one or more of the processing steps 301-323 enables the domain expert to set a predefined objective of reducing specified training data errors by applying error models to guide the training data selection process for optimum effect. Once the selected data is annotated by the domain expert, new training data is provided for input to the ground truth and applied to retrain the ML model. The ML model retraining may be performed at a cognitive system, such as the QA system 101, first computing system 14, or other NLP question answering system. For example, the SME-annotated new training data can be used as ground truth data to train QA systems, such as by presenting the ground truth data in the form of question-answer-passage (QAP) triplets or answer keys to a machine learning algorithm. Alternatively, the ground truth data can be used for blind testing by dividing the ground truth data into separate sets of questions and answers so that a first set of questions and answers is used to train a machine learning model by presenting the questions from the first set to the QA system, and then comparing the resulting answers to the answers from a second set of questions and answers.

By providing for configurable modeling parameters, the domain expert may configure the training data selection engine 16 to specify one or more predefined objectives when selecting unlabeled training data for SME evaluation. In selected example embodiments, one or more configurable modeling parameters (X, Y, Z) in the training data selection engine 16 may specify a first predefined objective of selecting X samples with an error likelihood that is higher than Y for error type Z. In another example embodiment, one or more configurable modeling parameters in the training data selection engine 16 may specify a second predefined objective for automating the machine learning error model generation where a domain expert trains "data-selection-model" apriori. Such a data-selection model can be trained from example of selected data (as positive example) and not selected data (as negative example) for a specific error type T. When such a machine learned model is trained, it can be applied to select new data for error type T.

By now, it will be appreciated that there is disclosed herein a system, method, apparatus, and computer program product for automatically selecting training data for updating a model based on error type analysis. As disclosed, the system, method, apparatus, and computer program product may be implemented at an information handling system having a processor and a memory by applying human-annotated training data ($D_i$) to a model, such as a machine learning model, to generate a plurality of results ($R_i$). Subsequently, the plurality of results ($R_i$) are evaluated to identify correct case results ($C_j$) and false case results ($F_k$). In selected embodiments, the results ($R_i$) are evaluated by identifying false case results ($F_k$) from the plurality of results ($R_i$) where a prediction from the model does not match a ground truth annotation from the human-annotated training data ($D_i$). In addition, the false case results ($F_k$) are categorized into one or more error type categories ($E_m$) which are used to build one or more error models ($EM_n$) corresponding to the one or more error type categories ($E_m$), where each error model is built from at least failed case results belonging to a corresponding error type. In selected embodiments, the false case results ($F_k$) are categorized using an error taxonomy to assign false case results ($F_k$) to one or more error type categories ($E_m$). In other embodiments, the error type categories ($E_m$) may be selected from a group consisting of classifier misprediction, negation error, and incorrectly labeled ground truth. In selected embodiments, the error models ($EM_n$) may be built by building at least a first machine learning error model using features extracted from the correct case results ($C_j$), false case results ($F_k$), and/or predetermined error type categories ($E_m$) as training data. Once the error models ($EM_n$) are built, unlabeled data samples are applied to the one or more error models ($EM_n$) to compute an error likelihood for each unlabeled data sample with respect to each error type category. Based on the computed error likelihoods for unlabeled data samples in a specified error type category meeting or exceeding an error threshold requirement, one or more unlabeled data samples are selected for annotation by a human subject matter expert and then displayed as prioritized review candidates to solicit labeling feedback from the human subject matter expert. Based on human subject matter expert annotation of the one or more unlabeled data samples in the specified error type category, update training data is provided to the model. In the disclosed system, method, apparatus, and computer program product, one or more training data selection parameters may be configured to provide user-specified objectives for updating the model based on the probabilities of the error types.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of automatically selecting training data for updating a model based on error type analysis, comprising:
applying, by an information handling system comprising a processor and a memory, human-annotated training data (Di) to a model to generate a plurality of results (Ri);
evaluating, by the information handling system, the plurality of results (Ri) to identify correct case results (C) and false case results (Fk);
categorizing, by the information handling system, the false case results (Fk) into one or more error type categories (Em) where the error type categories (Em) are selected from a group consisting of classifier misprediction, negation error, and incorrectly labeled ground truth;
building, by the information handling system, one or more error models (EM) corresponding to the one or more error type categories (Em), where each error model is built from at least failed case results belonging to a corresponding error type;
applying, by the information handling system, unlabeled data samples to the one or more error models (EM) to compute an error likelihood for each unlabeled data sample with respect to each error type category;
selecting, by the information handling system, one or more unlabeled data samples for annotation by a human subject matter expert based on a computed error likelihood for the one or more unlabeled data samples in a specified error type category meeting or exceeding an error threshold requirement; and
displaying, by the information handling system, the one or more unlabeled data samples as prioritized review candidates to solicit labeling feedback from the human subject matter expert.

2. The method of claim 1, where the model comprises a machine learning model.

3. The method of claim 1, where evaluating the plurality of results (Ri) comprises identifying false case results (Fk) from the plurality of results (Ri) where a prediction from the model does not match a ground truth annotation from the human-annotated training data (Di).

4. The method of claim 1, where categorizing the false case results (Fk) comprises using an error taxonomy to assign false case results (Fk) to one or more error type categories.

5. The method of claim 1, where the building one or more error models (EM) comprises building at least a first machine learning error model using features extracted from the correct case results (C), false case results (Fk), and/or predetermined error type categories (Em) as training data.

6. The method of claim 1, further comprising providing update training data to the model based on human subject matter expert annotation of the one or more unlabeled data samples in the specified error type category.

7. The method of claim 1, further comprising configuring, by the information handling system, one or more training data selection parameters to provide user-specified objectives for updating the model based on the probabilities of the error types.

8. An information handling system comprising:
one or more processors;
a memory coupled to at least one of the processors;
a set of instructions stored in the memory and executed by at least one of the processors to automatically select training data for updating a model based on error type analysis, wherein the set of instructions are executable to perform actions of:
applying, by the, human-annotated training data (Di) to a model to generate a plurality of results (Ri);
evaluating, by the system, the plurality of results (Ri) to identify correct case results (C) and false case results (Fk);
categorizing, by the system, the false case results (Fk) into one or more error type categories (Em) where the error type categories (Em) are selected from a group consisting of classifier misprediction, negation error, and incorrectly labeled ground truth;
building, by the system, one or more error models (EM) corresponding to the one or more error type categories (Em), where each error model is built from at least failed case results belonging to a corresponding error type;
applying, by the system, unlabeled data samples to the one or more error models (EM) to compute an error likelihood for each unlabeled data sample with respect to each error type category;
selecting, by the system, one or more unlabeled data samples for annotation by a human subject matter expert based on a computed error likelihood for the one or more unlabeled data samples in a specified error type category meeting or exceeding an error threshold requirement; and
displaying, by the system, the one or more unlabeled data samples as prioritized review candidates to solicit labeling feedback from the human subject matter expert.

9. The information handling system of claim 8, wherein the set of instructions are executable to evaluate the plurality of results (Ri) by identifying false case results (Fk) from the plurality of results (Ri) where a prediction from the model does not match a ground truth annotation from the human-annotated training data (Di).

10. The information handling system of claim 8, wherein the set of instructions are executable to categorize the false case results (Fk) by using an error taxonomy to assign false case results (Fk) to one or more error type categories (Em).

11. The information handling system of claim 8, wherein the set of instructions are executable to build one or more error models (EM) by building at least a first machine learning error model using features extracted from the correct case results (C), false case results (Fk), and/or predetermined error type categories (Em) as training data.

12. The information handling system of claim 8, wherein the set of instructions are executable to provide update training data to the model based on human subject matter expert annotation of the one or more unlabeled data samples in the specified error type category.

13. The information handling system of claim 8, wherein the set of instructions are executable to configure one or more training data selection parameters to provide user-specified objectives for updating the model based on the probabilities of the error types.

14. A computer program product stored in a computer readable storage medium, comprising computer instructions that, when executed by a processor at an information handling system, causes the system to automatically select training data for updating a model based on error type analysis by:
   applying human-annotated training data (Di) to a model to generate a plurality of results (Ri);
   evaluating the plurality of results (Ri) to identify correct case results (C) and false case results (Fk);
   categorizing the false case results (Fk) into one or more error type categories (Em) where the error type categories (Em) are selected from a group consisting of classifier misprediction, negation error, and incorrectly labeled ground truth;
   building one or more error models (EM) corresponding to the one or more error type categories (Em), where each error model is built from at least failed case results belonging to a corresponding error type;
   applying unlabeled data samples to the one or more error models (EM) to compute an error likelihood for each unlabeled data sample with respect to each error type category;
   selecting one or more unlabeled data samples for annotation by a human subject matter expert based on a computed error likelihood for the one or more unlabeled data samples in a specified error type category meeting or exceeding an error threshold requirement; and
   displaying the one or more unlabeled data samples as prioritized review candidates to solicit labeling feedback from the human subject matter expert.

15. The computer program product of claim 14, further comprising computer instructions that, when executed by the system, cause the system to evaluate the plurality of results (R,) by identifying false case results (Fk) from the plurality of results (R,) where a prediction from the model does not match a ground truth annotation from the human-annotated training data (Di).

16. The computer program product of claim 14, further comprising computer instructions that, when executed by the system, cause the system to categorize the false case results (Fk) by using an error taxonomy to assign false case results (Fk) to one or more error type categories (Em).

17. The computer program product of claim 14, further comprising computer instructions that, when executed by the system, cause the system to build one or more error models (EM) by building at least a first machine learning error model using features extracted from the correct case results (C), false case results (Fk), and/or predetermined error type categories (Em) as training data.

18. The computer program product of claim 14, further comprising computer instructions that, when executed by the system, cause the system to provide update training data to the model based on human subject matter expert annotation of the one or more unlabeled data samples in the specified error type category.

19. The computer program product of claim 14, further comprising computer instructions that, when executed by the system, cause the system to configure one or more training data selection parameters to provide user-specified objectives for updating the model based on the probabilities of the error types.

* * * * *